(12) United States Patent
Achterholt

(10) Patent No.: US 7,866,206 B2
(45) Date of Patent: Jan. 11, 2011

(54) METHOD AND SYSTEM FOR DETERMINATION OF A WHEEL POSITION OF WHEELS ON A VEHICLE

(75) Inventor: Rainer Achterholt, Landschlacht (CH)

(73) Assignee: Global Dynamix AG, St. Moritz (CH)

( * ) Notice: Subject to any disclaimer, the term of this patent is extended or adjusted under 35 U.S.C. 154(b) by 468 days.

(21) Appl. No.: 11/916,768

(22) PCT Filed: May 5, 2006

(86) PCT No.: PCT/EP2006/004286
§ 371 (c)(1),
(2), (4) Date: May 5, 2008

(87) PCT Pub. No.: WO2006/131182
PCT Pub. Date: Dec. 14, 2006

(65) Prior Publication Data
US 2008/0196492 A1 Aug. 21, 2008

(30) Foreign Application Priority Data
Jun. 10, 2005 (DE) ........................ 10 2005 026 974

(51) Int. Cl.
B60C 23/02 (2006.01)
(52) U.S. Cl. .................................... 73/146.5
(58) Field of Classification Search ............... None
See application file for complete search history.

(56) References Cited
U.S. PATENT DOCUMENTS
6,204,758 B1 3/2001 Wacker et al.

| | | |
|---|---|---|
| 6,237,403 B1 | 5/2001 | Oldenettel et al. |
| 6,446,502 B1 | 9/2002 | Normann et al. |
| 6,633,229 B1 * | 10/2003 | Normann et al. ............ 340/447 |

FOREIGN PATENT DOCUMENTS

| DE | 4205911 | 9/1993 |
|---|---|---|
| DE | 4303583 | 8/1994 |
| DE | 19608478 | 5/1997 |
| DE | 19856861 | 6/2000 |
| DE | 19921413 | 11/2000 |
| DE | 19939936 | 3/2001 |

(Continued)

OTHER PUBLICATIONS

Kneubühl, F.K.: Repetitorium der Physik, 2.überarb. und erw. Aufl., Stuttgart, Teubner, 1982, ISBN: 3-519-13012-2 S. 86-89.

(Continued)

Primary Examiner—Lisa M Caputo
Assistant Examiner—Jermaine Jenkins
(74) Attorney, Agent, or Firm—Frost Brown Todd LLC

(57) ABSTRACT

Method and system for determination of wheel position of wheels on vehicles with which Coriolis forces (Chl, Chr, Cvl, Cvr) active for the wheels (Rhl, Rhr, Rvl, Rvr) of a vehicle are determined, the Coriolis forces (Chl, Chr, Cvl, Cvr) determined for the wheels (Rhl, Rhr, Rvl, Rvr) are compared with each other and the wheel positions of the wheels (Rhl, Rhr, Rvl, Rvr) of the vehicle are determined by means of the comparison.

10 Claims, 3 Drawing Sheets

FOREIGN PATENT DOCUMENTS

| | | |
|---|---|---|
| DE | 10012458 | 7/2002 |
| DE | 10144360 | 4/2003 |
| DE | 10307265 | 10/2003 |
| DE | 10316074 | 10/2004 |
| DE | 102004037326 | 1/2006 |
| EP | 0760299 | 7/1996 |
| EP | 1003647 | 7/1998 |
| EP | 1215056 | 6/2002 |
| EP | 1452349 | 9/2004 |
| WO | WO2006/082021 | 8/2006 |

OTHER PUBLICATIONS

PCT International Search Report, PCT/EP2006/004286.
PCT International Search Report, PCT/EP2006/000823.
U.S. Appl. No. 11/813,945.

* cited by examiner

METHOD AND SYSTEM FOR DETERMINATION OF A WHEEL POSITION OF WHEELS ON A VEHICLE

FIELD OF THE INVENTION

The present invention generally concerns monitoring of wheels of a vehicle, like a land vehicle, for example, passenger car, two-wheeled, four-wheeled or multiwheeled vehicles in general, etc. and especially for determination of wheel position of wheels on a vehicle.

BACKGROUND OF THE INVENTION

To monitor the wheels of a vehicle it is desirable not only to be able to make assertions concerning the state of the wheels overall, but also assertions concerning each wheel, in particular. For example, it is desirable to be able to inform the driver not only that the pressure of a tire is too high or too low, but for which wheel this is the case. For this purpose it is necessary to know the corresponding wheel positions of the wheels on the vehicle (for example, front left tire). Since wheels of vehicles are regularly removed, such wheel position determination is necessary after each new mounting of a wheel. The approaches to carry out this automatically without involvement of the driver are known.

For example, it is known from DE 196 08 478 A1 to equip each wheel with a transmitter that transmits radio signals to a control. Based on the signal intensity received by the control, a conclusion can be drawn concerning the distance between the control and the corresponding transmitter and therefore the wheel position of the corresponding wheel. A drawback is that receiving devices assigned to individual wheels are used, which make this approach demanding and expensive.

It is known from DE 103 16 074 A1 to determine the wheel positions of wheels of a vehicle on the basis of information indicating the steering angle for steerable or steered wheels and the slope angle (camber) for all wheels. For this person motion sensors are used to record the corresponding steering angle and slope sensors to record the slope angle. Here again the number of required sensors represents a drawback. In addition, wheel position determination occurs here by conducting two methods in succession.

The task of the present invention is to determine the wheel position of a wheel on a vehicle in a simpler and faster manner, especially to reduce the number of components and process steps used for this purpose.

BRIEF SUMMARY OF THE INVENTION

To solve this task the present invention provides a method and system according to the independent claims. Additional aspects of the invention are apparent from the dependent claims, the following description and the drawing.

In the method according to the invention, Coriolis forces active for the wheels of the vehicle are determined. The Coriolis forces recorded for the wheels are then compared with each other. By means of the comparison or the results of the comparison, the wheel positions of the wheels on the vehicle are determined.

Coriolis forces active for the vehicle are also preferably determined, which can then be used as a reference quantity in comparison of the Coriolis forces recorded for the wheels.

In another preferred variant, the Coriolis forces active for the wheels of a vehicle are determined by recording Coriolis accelerations active for the wheels.

The wheel for which essentially no or the smallest Coriolis forces are determined is preferably determined as the spare tire.

In a preferred variant, the wheel for which the largest Coriolis force was determined is determined as the front wheel of the vehicle when the method according to the invention is conducted for a vehicle with two wheels.

In a preferred variant, the wheel for which the smallest Coriolis force was determined is determined as the rear wheel of the vehicle when the method according to the invention is carried out on the vehicle with two wheels.

In a preferred variant, Coriolis forces active for wheels of the vehicle are determined so that the signal stating the active Coriolis forces are generated, which have different signs for wheels on different sides of the vehicle, in which the wheels whose signals indicating Coriolis forces have the same side can be determined as the wheels on one side of the vehicle if the method according to the invention is conducted on a vehicle with four wheels.

In a preferred variant, Coriolis forces active for the vehicle are determined so that the signal indicating active Coriolis forces are generated whose signs differ for curves in different directions.

In a preferred variant, the wheels arranged on one side of the vehicle and the wheels arranged on the other side of the vehicle are determined by comparison of the signals indicating Coriolis forces active for wheels of the vehicle and the signs of the signals indicating Coriolis forces active for the vehicle.

In a preferred variant, the wheels for which essentially the same Coriolis forces were determined and its Coriolis forces are smaller in comparison with Coriolis forces of the other wheels are determined as rear wheels of the vehicle.

It is also prescribed here to determine the wheels, whose Coriolis forces are greater in comparison with the Coriolis forces of the rear wheels, as the front wheels of the vehicle.

If the method according to the invention is conducted for a vehicle whose front wheels have a camber, it is proposed to determine the wheels for which signals indicating Coriolis forces indicate essentially the same Coriolis forces and have different signs as rear wheels and the other wheels for which signals indicating Coriolis forces indicate different Coriolis forces and have different signs as front wheels.

If the method according to the invention is conducted for a vehicle whose front wheels have a positive camber, it is proposed to determine the front wheel, whose Coriolis forces are greater in comparison with the Coriolis forces of the other front wheel, as the inside front wheel of the vehicle.

If the method according to the invention is conducted for a vehicle, whose front wheels have a negative camber, it is proposed to determine the front wheel, whose Coriolis forces are smaller compared with the Coriolis forces of the other front wheel, as the inside front wheel of the vehicle.

In a preferred variant, the path forces active for wheels of the vehicle are determined, the path forces determined for the wheels are compared with each other and wheel positions on different sides of the vehicle are determined by means of the comparison.

In a preferred variant, the method according to the invention is conducted after each new start of the vehicle, in which it is prescribed after determination of the wheel positions to assign them permanently to the wheels until the next new start.

In another preferred variant, the method according to the invention is conducted when the vehicle is brought into operation for the first time or when a wheel change has occurred in which it is prescribed after determination of the wheel positions to permanently assign them to the wheels until the next wheel change.

The system according to the invention includes a control with a receiving device and wheel units that are provided for a wheel of the vehicle. Each wheel unit includes a wheel sensor arrangement to record Coriolis forces active for the corresponding wheel and to produce signals that indicate the determined Coriolis forces and a transmission device that transmits signals of the wheel sensor arrangement to the receiving device of the control. In addition, the control is set up to compare the Coriolis forces determined for the wheels with each other based on received signals indicating the determined Coriolis forces and to determine the wheel positions of the wheel on the vehicle by means of comparison.

The control can be furnished as a separate component or by a central control of the vehicle also referred to as an ECU (Electronic Control Unit). This also applies for the receiving device of the control and for other components assigned to the control, for example, the central unit described below.

The receiving and transmitting devices can be designed for wireless and/or wired communication with others. For example, it is prescribed that the transmitting devices transfer their signals by radio to the receiving device of the control or by radio to an intermediate device (for example, another receiver and/or antenna) from which signal transmission by wire to the receiving device of the control occurs.

Here and subsequently "set up" is understood to mean that the control is designed at least structurally in order to furnish the stated technical functional features. In addition, the control could also be programmed in order to furnish the stated technical functional features, for example, using software code or computer programs. For example, it is prescribed that the functions of the control be furnished by corresponding hardware structure (for example, ASCI). The control can also be designed so that it generally applicable hardware structure, and then furnishes the technical functional features of the control in conjunction with the corresponding program (for example, permanently implemented software code, computer program furnished on computer-readable storage medium, software code or computer program reloadable for operation).

Preferably the system includes a central unit having a central sensor arrangement to record Coriolis forces active for the vehicle and to produce signals indicating the determined Coriolis forces, and a central transmission device to transmit signals of the central sensor arrangement to the receiving device of the control, the control preferably being set up to compare the Coriolis forces determined for the wheels with each other using the Coriolis forces determined for the vehicle as a reference quantity.

The control is preferably laid out to determine the wheel for which essentially no or the smallest Coriolis forces were determined as a spare wheel of the vehicle.

The control is preferably laid out to determine the wheel for which the largest Coriolis forces are determined as the front wheel of the vehicle when the vehicle is a vehicle with two wheels.

The control is preferably laid out to determine the wheel for which the smallest Coriolis forces are determined as the rear wheel of the vehicle when the vehicle is a vehicle with two wheels.

The wheel sensor devices are preferably designed to determine the Coriolis forces active for the wheels so that the signal indicating the active Coriolis forces are generated which have different signs for wheels on different sides of the vehicle, in which the control is preferably laid out to determine the wheels for which signals indicating Coriolis forces of the same sign were determined as wheels on one side of the vehicle when the vehicle is a vehicle with four wheels.

The central unit is preferably laid out to determine the Coriolis forces active for the vehicle so that the signals indicating active Coriolis forces are generated whose signs differ for curves in different directions.

The control is preferably laid out to determine the wheels that are arranged on one side of the vehicle and the wheels that are arranged on the other side of the vehicle by comparison of the signs of the signals indicating Coriolis forces and the signs of the signals indicating Coriolis forces active for the vehicle.

The control is preferably laid out to determine the wheels for which essentially the same Coriolis forces were determined and whose Coriolis forces are smaller in comparison with the Coriolis forces of the other wheels as the rear wheels of the vehicle.

It is then described that the control is laid out to determine the wheels, whose Coriolis forces are greater in comparison with the Coriolis forces of rear wheels, as the front wheels of the vehicle.

If the system according to the invention is used for a vehicle whose front wheels have a camber, it is proposed that the control be laid out to determine the wheels for which signals indicate essentially equally large Coriolis forces and have different signs as rear wheels and the other wheels for which signals indicating Coriolis forces indicate different Coriolis forces and have different signs as front wheels.

If the system according to the invention is used for a vehicle whose front wheels have a positive camber it is prescribed that the control be laid out to determine the front wheels, whose Coriolis forces are smaller in comparison with the Coriolis forces of the other front wheel, as the inside front wheel of the vehicle.

If the system according to the invention is used for a vehicle whose front wheels have a negative camber it is prescribed that the control be laid out to determine the front wheel, whose Coriolis forces are greater in comparison with the Coriolis forces of the other front wheel, as the inside front wheel of the vehicle.

The wheel sensor arrangements to record path forces active for the corresponding wheel and to produce signals indicating the determined path forces are preferably laid out in which it is prescribed that the control be laid out to compare the path forces determined from the wheels with each other and to determine the wheel positions on different sides of the vehicle by means of the comparison.

The sensor arrangements preferably include at least one acceleration sensor with which Coriolis accelerations active for the wheels of the vehicle can be determined in order to determine the Coriolis forces active for the wheels of the vehicle.

It is then possible that the wheel sensor arrangement are set up to produce signals that indicate the determined Coriolis accelerations and the control are set up to determine the wheel positions of the wheels by means of the signals indicating Coriolis accelerations.

As an alternative it is possible that the wheel sensor arrangements are set up to produce signals based on their determined Coriolis accelerations that indicate the corresponding Coriolis forces in which the control, as stated above, uses this to determine the wheel positions.

The sensor arrangement can also have an acceleration sensor with which Coriolis forces active for the vehicle can be determined in order to determine the Coriolis forces active for the vehicle. Comparable to the variants of the wheel sensor arrangement mentioned above, the central sensor arrangement can produce signals that indicate Coriolis accelerations or Coriolis forces.

BRIEF DESCRIPTION OF THE DRAWINGS

In the following description of preferred variants the accompanying figures are referred to, in which.

Comparable components depicted in the figures are indicated by the same reference numbers.

The references used in the figures are as follows.

R=wheel
h=rear
v=front
l=left
r=right
z=central
Z=centrifugal forces or accelerations
B=path forces or accelerations
C=Coriolis forces or accelerations
RE=wheel unit
ZE=central unit
An=antenna Black arrows in the figures give the orientation or alignment of the corresponding sensor arrangement (i.e., for quantities recorded in the direction of arrows signals with a positive sign are produced).

Gray arrows in the figures give the forces or accelerations active for the wheels of the vehicle (for example, centrifugal, path or Coriolis forces or accelerations).

DESCRIPTION OF PREFERRED VARIANTS

Figure 1:
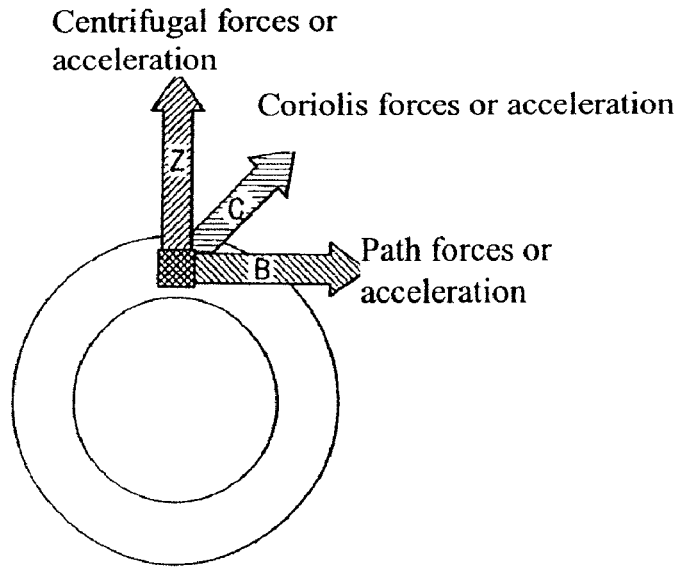
FIG. 1 shows a schematic view of forces and accelerations acting on a wheel of a vehicle.

FIG. 1 schematically shows the forces and accelerations acting on a wheel of a driving vehicle. It will be assumed for simplification below that the vehicle moves in the forward direction in straight or curve travel. Comments in this respect apply accordingly for a vehicle in backward travel.

By rotation of the wheel based on the moving vehicle, centrifugal forces or accelerations occur on the wheel, which depend on the speed of the wheel, which is again determined by the speed of the vehicle.

Centrifugal accelerations can be divided into three components:

A first component, which is attributed to translatory accelerations, especially from acceleration and braking of the vehicle. The first component is zero in a standing vehicle and greater than zero in a moving vehicle as a function of the vehicle speed.

A second component, which is attributed to acceleration of gravity.

A third component, which is attributed to translatory speed.

During rotation of the wheel path forces or accelerations also occur which also depend on the rotational speed of the wheel. Path forces or accelerations are subsequently understood to mean forces or accelerations on the wheel that occur in the peripheral direction of the wheel.

Path accelerations can also be divided into three components:

A first component, which is attributed to translatory accelerations, especially from acceleration of braking of the vehicle. The first component is zero in a standing or uniformly moving vehicle and not equal to zero in a moving vehicle.

The second component is attributed to acceleration of gravity.

A third component, which is attributed to translatory speeds. The third component can also occur during uniform movement of the vehicle because sensors to record path accelerations generally cover a nonuniform path despite uniform vehicle movement and record path accelerations accordingly.

In addition, Coriolis forces or accelerations can occur on the wheel, namely especially when the vehicle is traveling through a curve. Coriolis forces or accelerations depend among other things on the rotational speed of the wheel and the angle between the direction of movement of the wheel and the center of the curve (axis of rotation of the moving system "vehicle"). Mathematically the amount of Coriolis force Fc (which is designed with the reference letter C in the figures) are given as follows:

$$Fc = 2 \times m \times v \times \omega \times \sin\theta,$$

in which
m is the weight of the wheel,
v is the velocity of the vehicle,
$\omega$ is the angular frequency of wheel rotation and
$\theta$ the angle between the movement direction of the wheel and the center of the curve.

To record centrifugal, path and Coriolis forces or accelerations acting on a wheel of the vehicle, uniaxial force or acceleration sensors, biaxial force or acceleration sensors can be used to record two type of force or acceleration (for example, for Coriolis forces or accelerations and for path forces or accelerations or for centrifugal forces or accelerations and for path forces or accelerations) or motion detectors (for example, detectors with moving spheres). Because of their design and weight so-called MEMS force or acceleration sensors are advantageous, in which MEMS stands for microelectromechanical system.

To record path and Coriolis forces or accelerations acting on a wheel of the vehicle it is advantage to arrange the sensors in or an all wheels in the same position or orientation. Appropriate sensors generally give not only the amount of forces or accelerations recorded in the direction of their measurement axis but also whether the recorded forces or accelerations act in the direction of the measurement axis or in the opposite direction. Accordingly the same installation position or orientation for all sensors means that sensors for wheels on one side (for example, the left side) of the vehicle produce signals indicating path and Coriolis forces or accelerations with signs that are opposite the signs that signals indicating the path and Coriolis forces or accelerations have in the sensors for the wheels on the other side (for example, the right side) of the vehicle.

Figure 2:
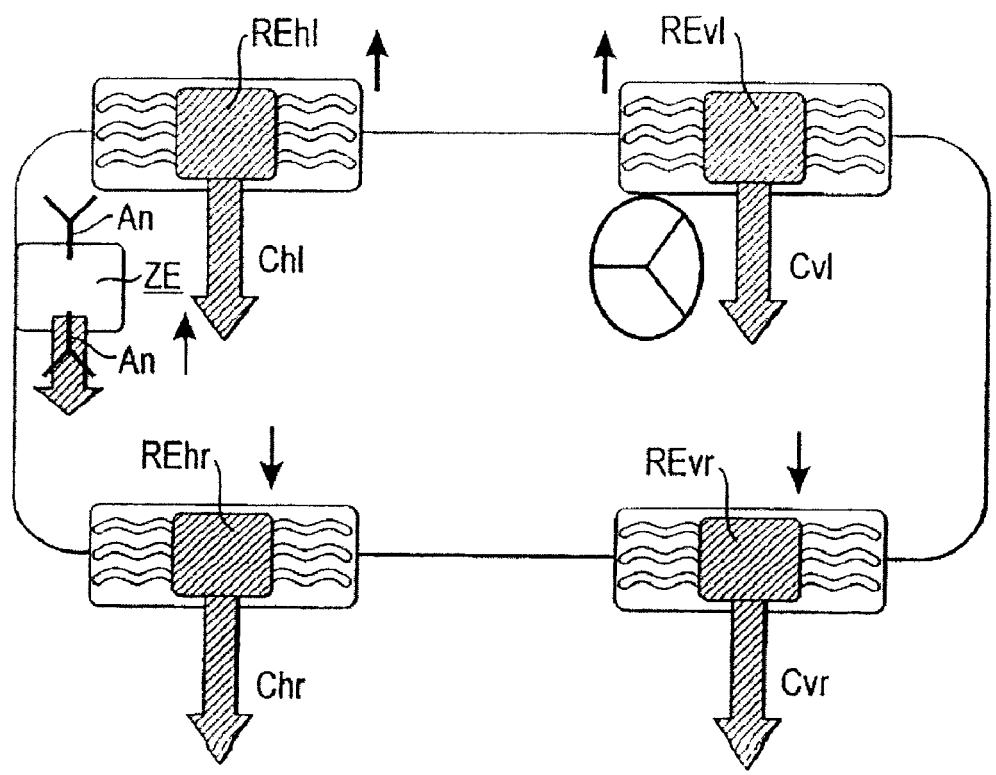
FIG. 2 shows a schematic view of a preferred variant of the present invention.

FIG. 2 schematically shows a vehicle (not designated) with a preferred variant of the system according to the invention and serves to explain the proposed variants of the method according to the invention.

The vehicle has four installed wheels Rhl, Rhr, Rvl and Rvr. The vehicle also has a spare tire not shown. Each wheel Rhl, Rhr, Rvl and Rvr is assigned a wheel unit REhl, REhr, REvl and REvr.

Each wheel unit REhl, REhr, REvl and REvr includes a wheel sensor arrangement (not shown) with one or more sensors in order to record Coriolis forces and/or accelerations acting on the corresponding wheel. Signals indicating recorded Coriolis forces and/or accelerations, generated by the wheel sensor arrangements are transmitted to a receiving device using transmission devices present in each wheel unit REhl, REhr, REvl and REvr (not shown). Subsequently it is assumed that transmission of information from the wheel units REhl, REhr, REvl and REvr to the receiving device is wireless.

The receiving device is enclosed by a control (not shown). To explain the receiving device, two antennas An are shown for simplification in FIG. 2. Signals transferred from the transmitting devices of the wheel REhl, REhr, REvl and REvr are received by the antennas An and furnished in the control.

As further explained below, instead of the transmitting devices of the wheel units REhl, REhr, REvl and REvr and the receiving devices of the wheel units REhl, REhr, REvl and REvr transmitting/receiving devices included by the control can be used, which permit bidirectional information transfer between the wheel units REhl, REhr, REvl and REvr and the control. Such variants can be used for example, in order to assign certain wheel positions to the wheels, as described below.

The control can optionally include a central unit ZE. The central unit ZE has a central sensor arrangement (not shown) with one or more sensors in order to record the Coriolis forces and/or Coriolis accelerations acting on the vehicle. Signals indicating recorded Coriolis forces and/or accelerations generated by the central sensor arrangements are transmitted to the receiving device of the control using a central transmitting device (not shown) of the central unit ZE. It is assumed below that transmission of information from the central unit ZE to the control occurs by wire; this is especially prescribed in the central unit, is arranged adjacent to the control or included by it.

During use of a central unit ZE signals produced from the central sensor arrangement can be used in order to determine whether the vehicle is traveling on a left curve or right curve.

Starting from the arrangement depicted in FIG. 2, the central sensor arrangement is aligned so that it produces signals Cz indicating positive current Coriolis forces and/or accelerations during a left curve and signals Cz indicating negative current Coriolis forces and/or accelerations during a right curve.

Also starting from the arrangement depicted in FIG. 2, the wheel sensor arrangements of wheel units REhl, REvl, REhr and REvr are arranged in the same way orientation in or on wheels REhl, REvl, REhr and REvr.

According to the arrangements depicted in FIG. 2, the wheel sensor arrangements of the wheel units REhl and REvl are aligned on the left side of the vehicle so that they produce signals Chl or Cvl indicating positive current Coriolis forces and/or accelerations during a left curve and signals Chl or Cvl indicating negative current Coriolis forces and/or accelerations during a right curve.

According to the arrangement depicted in FIG. 2 the wheel sensor arrangements of wheel units REhr and REvr are aligned on the right side of the vehicle so that they produce signals Chr or Cvr indicating negative current Coriolis forces and/or accelerations during a left curve and signals Chr or Cvr indicating positive current Coriolis forces and/or accelerations during a right curve.

Accordingly, by comparing the sign of the signals Cz produced by the central sensor arrangement and the sign of the signals Chl, Cvl, Chr and Cvr produced by the wheel sensor arrangements of the wheel units REhl, REvl, REhr and REvr it is possible to determine which wheel units are arranged on the left side of the vehicle and which wheel units on the right side of the vehicle.

The movement direction of the front wheels Rvl and Rvr and the movement direction of the rear wheels Rhl and Rhr relative to the center of the curve differ because of the steering angle of the front wheels Rvl and Rvr required for curved travel.

The movement direction of the front wheels Rvl and Rvr essentially follows the radius of the curve. Consequently, an angle θ between the movement direction of front wheels Rvl and Rvr and the center of the curve of about 90° and a sine of the angle (sin θ) of about 1 can be assumed.

On the other hand, the movement direction of rear wheels Rhl and Rhr does not follow the radius of the curve but runs tangentially to it. Consequently, an angle θ between the movement direction of the rear wheels Rhl and Rhr and the center of the curve not equal to 90° and the sine of the angle (sin θ) not equal to 1 can be assumed.

It therefore follows that larger Coriolis forces or accelerations are active for the front wheels Rvl and Rvr than for the rear wheels Rhl and Rhr.

By comparison of the signals produced from the wheel sensor arrangements of wheel units REhl, REvl, REhr and REvr is possible to determine which wheel units are arranged on the front of the vehicle and which wheel units on the rear of the vehicle.

In conjunction with the determination concerning which wheel units are situated on which vehicle side, the position on the vehicle can be determined for each wheel unit and therefore for each wheel.

The spare tire can also be determined. The spare tire has a sensor arrangement comparable to the wheel sensor arrangements of the wheel units REhl, REvl, REhr and REvr, which is arranged in the orientation explained for the wheel sensor arrangement of the wheel units REhl, REvl, REhr and REvr in or on the spare tire. Based on the general horizontal or vertical positioning across the direction of travel of the spare tire, no or, for example, based on a vehicle slope during curved travel only slight Coriolis forces and/or accelerations are recorded by the wheel sensor arrangement of the spare tire. Accordingly, the wheel unit from which no or the smallest Coriolis forces and/or accelerations are determined can be determined as the wheel unit of the spare tire and therefore the spare tire.

If the position of a wheel unit to wheels is determined, it is prescribed to permanently assign the corresponding position to the wheel units at least during actual operation of the vehicle. This an occur for example by assigning a code to the control of the wheel units and transmitting this to the corresponding wheel unit. During subsequent data transmission for the wheel units, for example, in the form of signals indicating tire pressures, the corresponding code is transferred to the control. This permits the control to determine from which wheel unit or which wheel the data were transmitted.

If the central unit ZE is not used, it is prescribed to make the distinction between wheels on the left side of the vehicle and wheels on the right side of the vehicle merely by means of the determined Coriolis forces and/or accelerations.

Vehicle wheels ordinarily have a camber. While the camber of the rear wheels generally does not change during curve travel, the camber of the front wheels changes relative to the camber during straight travel. The camber of the inside wheel also changes differently than the camber of the outside wheel.

If the front wheel during straight travel each have a negative camber, the camber of the inside front wheel is "less negative" whereas the camber of the outside front wheel is "more negative". Starting from an arrangement of the wheel units perpendicular to the center plane of the wheel (measurement direction perpendicular to the center plant of the wheel), larger Coriolis forces and/or accelerations are determined for the inside front wheel than for the outside front wheel because the percentages of Coriolis forces and/or accelerations in the measurement direction of the sensor arrangement of the inside front wheel are greater than the percentages of Coriolis forces and/or accelerations in the measurement direction of the sensor arrangement of the outside front wheel.

If the front wheels during straight travel each have a positive camber, the camber of the inside front wheel will be more strongly positive, whereas the camber of the outside front wheel will be less positive. Starting from an arrangement of the wheel units perpendicular to the center plane of the wheel (measurement direction perpendicular to the center plane of the wheel), smaller Coriolis forces and/or accelerations are determined for the inside front wheel than for the outside front wheel because the percentages of Coriolis forces and/or accelerations in the measurement direction of the sensor arrangement of the inside front wheel are smaller than the percentage of Coriolis forces and/or accelerations in the measurement direction of the sensor arrangement of the outside front wheel.

The wheel units on the front of the vehicle and the wheel units on the rear of the vehicle, as stated above, are determined by means of the different Coriolis forces and/or accelerations for the front wheels and rear wheels.

As a supplement or alternative, the wheel units on the front of the vehicle and the wheel units on the rear of the vehicle can be determined as follows. Wheel units on the rear wheels furnish signals that indicate roughly the same Coriolis forces and/or accelerations but have different signs. Wheel units on the front wheels furnish signals that indicate different Coriolis forces and/or accelerations and have different signs. Front and rear wheel units can be determined form this information.

Depending on the camber prescribed for the front wheels, by comparison of the Coriolis forces and/or accelerations recorded for wheel units it can be determined which wheel unit is arranged in or on the inside front wheel and which wheel unit is arranged in or on the outside front wheel. By means of the sign of the signals furnished from the wheel units a determination is the possible concerning which wheel unit is arranged in or on the inside rear wheel and which wheel unit is arranged in or on the outside rear wheel.

Figure 3:
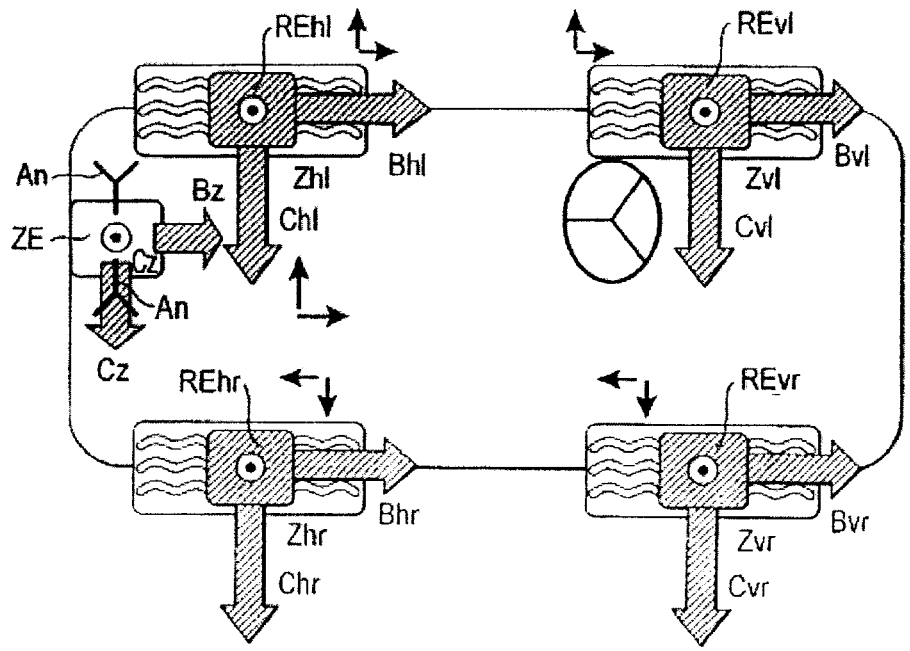
FIG. 3 shows a schematic view of another preferred variant of the present invention.

The components of the variant schematically explained in FIG. 3 eventually correspond to the components of the variant of FIG. 2, apart from the following differences, for which reason the comments made above with reference to design, function and method of operation of the variant of FIG. 2 apply accordingly for the comments of FIG. 3.

The wheel units REhl, REvl, REhr and REvr of the variant of FIG. 3 have wheel sensor arrangements (not shown), which are laid out to record path forces and/or accelerations and/or centrifugal forces or accelerations, in addition to recording Coriolis forces or accelerations.

The central unit ZE of the variant of FIG. 3 has a central sensor arrangement (not shown), which is laid out to record path forces or accelerations and/or centrifugal forces or accelerations in addition to recording Coriolis forces or accelerations.

In the variant of FIG. 3, determination of positions of the wheel units and therefore a wheel position, as described for the variant of FIG. 2 during use of central unit ZE can occur with reference to Coriolis forces and/or accelerations determined for vehicle wheels and the vehicle.

In addition, in the variant of FIG. 3, determination of positions of the wheel units and therefore a wheel position, as described for the variant in FIG. 2 can occur without use of the central unit ZE by means of Coriolis forces and/or accelerations determined from vehicle wheels.

Especially in the last mentioned determination of a wheel position, it is prescribed to distinguish between wheel units and therefore wheel positions on the left side of the vehicle and wheel units and therefore wheel positions on the right side of the vehicle based on path forces or accelerations and/or centrifugal forces or accelerations determined for the vehicle wheels.

It is assumed below that the wheel sensor arrangements of the wheel units REhl, REvl, REhr and REvr are laid out to record both path forces and accelerations and centrifugal forces or accelerations. However, wheel units REhl, REvl, REhr and REvr are also provided whose wheel sensor arrangements record either just path forces or accelerations or just centrifugal forces or accelerations. For such variants the following comments also apply.

Starting again from the arrangement shown in FIG. 3, the wheel sensor arrangements of wheel units REhl, REvl, REhr and REvr are arranged in the same orientation in or on wheels Rhl, Rvl, Rhr and Rvr.

According to the arrangement depicted in FIG. 3, the wheel sensor arrangements of wheel units REhl and REvl are aligned on the left side of the vehicle so that they produce signals Bhl or Bvl indicating positive actual path forces or accelerations during straight travel and the wheel sensor arrangement of wheel units REhr and REvr are aligned on the right side of the vehicle so that they produce signals Bhr or Bvr indicating negative actual path forces or accelerations during straight travel.

Accordingly, by comparison of the sign of the signals Bhl, Bvl, Bhr and Bvr produced by the wheel sensor arrangements of the wheel units REhl, REvl, REhr and REvr, it is possible to determine which wheel units are arranged on the left side of the vehicle and which wheel units are arranged on the right side of the vehicle.

Figure 4:
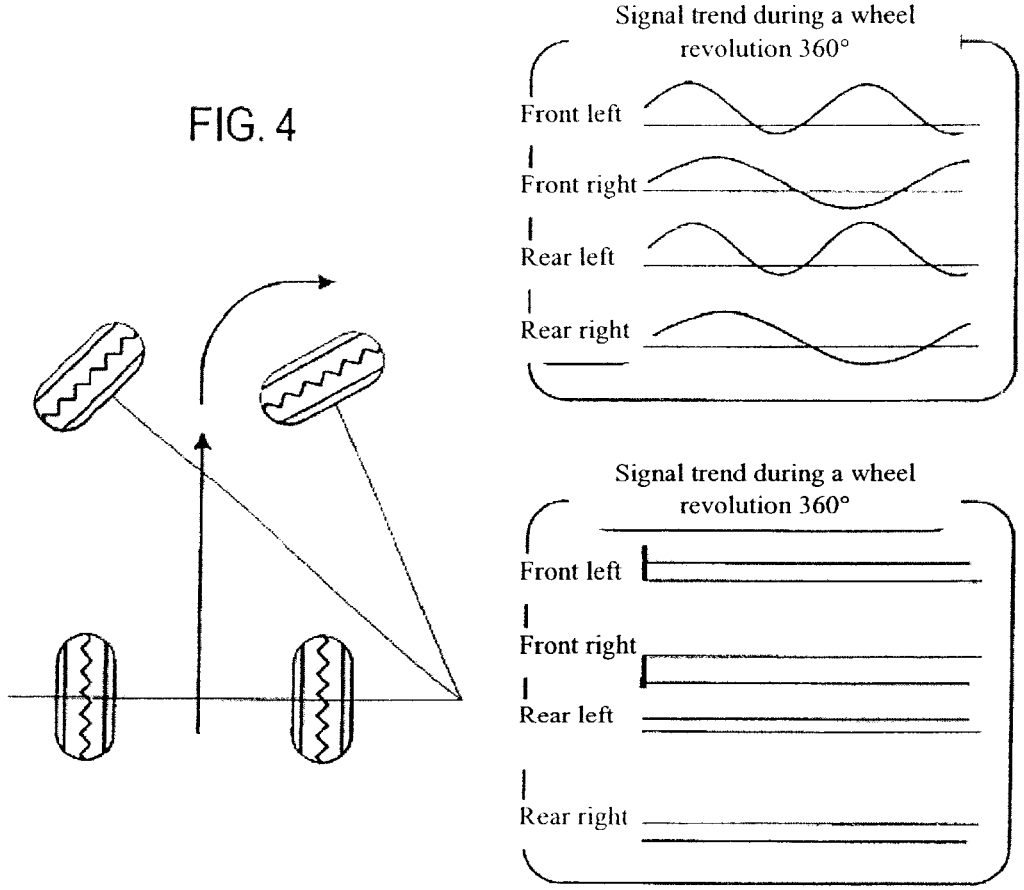
FIG. 4 shows schematic views of path accelerations and Coriolis accelerations during curve travel using the variant of FIG. 3.

During curve travel path accelerations and Coriolis accelerations active on the wheels are shown in idealized fashion especially in FIG. 4 in that none of the Coriolis accelerations active on the rear wheels Rhl and Rhr are shown. The different signs of the signals indicating Coriolis accelerations in the lower right of FIG. 4 are obtained from the identical orientation arrangement of the wheel sensor arrangements of wheel units REhl, REvl, REhr and REvr.

As follows from the top right of FIG. 4, a distinction can be made between wheels on the left side of the vehicle and wheels on the right side of the vehicle based on the signals indicating path accelerations. As follows from the lower right of FIG. 4, a distinction can be made between front wheels and rear wheels based on the signals indicating Coriolis accelerations. By means of this information the wheel units REhl, REvl, REhr and REvr and the wheels Rhl, Rvl, Rhr and Rvr can be classified relative to each other so that an unambiguous determination of the corresponding position of the wheels Rhl, Rvl, Rhr and Rvr on the vehicle is possible.

Figure 5:
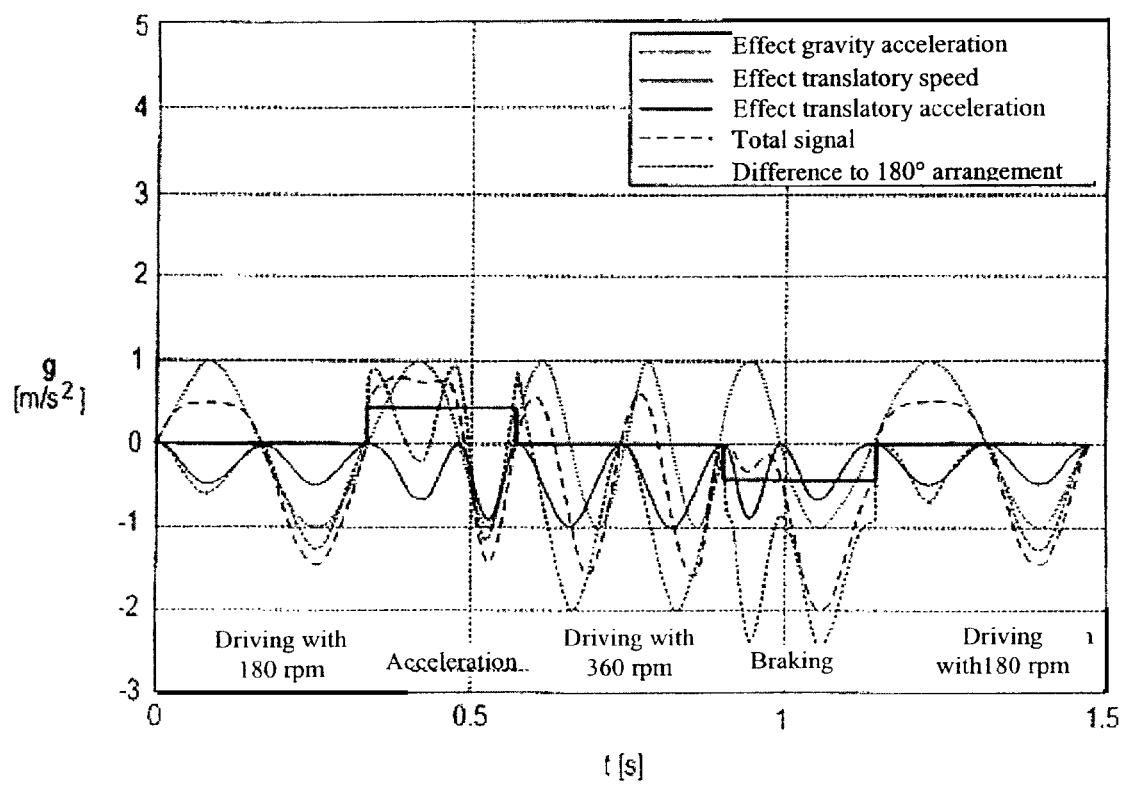
FIG. 5 shows a graphic view of path accelerations and its components determined by the variant of FIG. 3

FIG. 5 shows a graphic representation of path accelerations recorded with a path sensor arrangement in which the aforementioned signal trends indicating three components, a signal trend indicating path accelerations acting overall and a signal trend are shown, which gives the difference between the signal trend indicating the path accelerations acting overall and a corresponding signal trend of a wheel unit arranged on the other side of the vehicle.

In addition, according to the arrangement depicted in FIG. 3, the wheel sensor arrangement of wheel units REhl, REvl, REhr and REvr are aligned so that they produce Zhl, Zvl, Zhr and Zvr indicating positive current centrifugal forces or accelerations in the moving vehicle.

Figure 6:
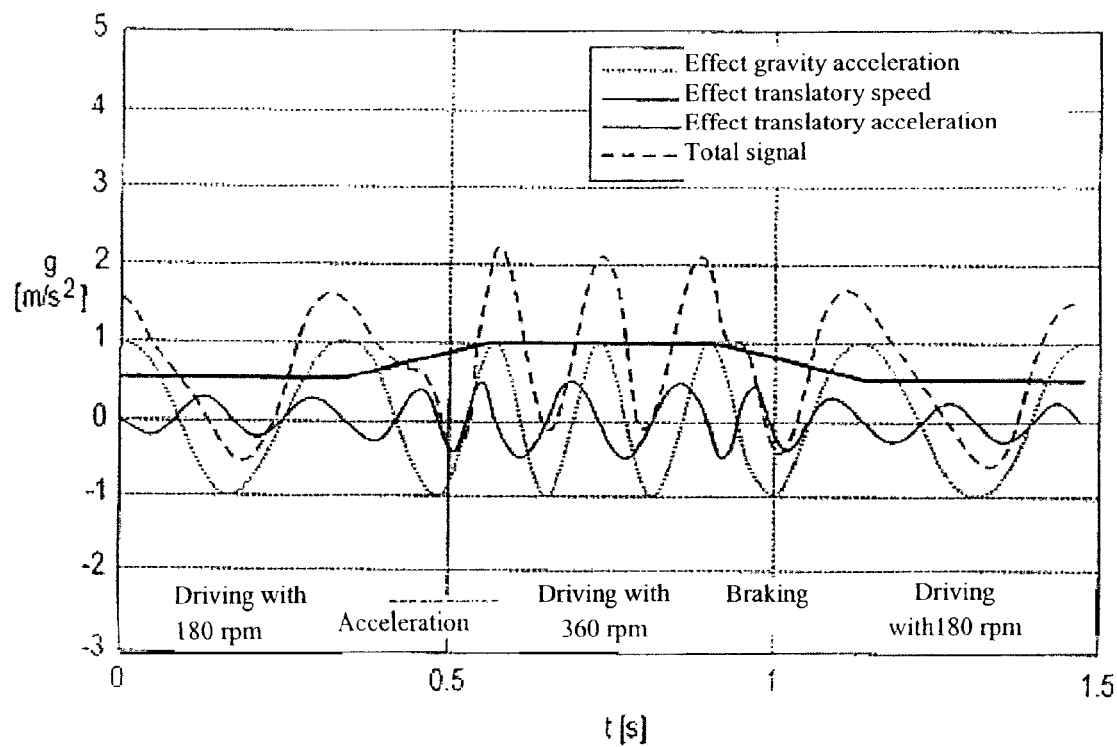
FIG. 6 shows a graphic view of centrifugal accelerations and its components determined in the variant of FIG. 3.

FIG. 6 shows a graphic depiction of centrifugal accelerations recorded with a wheel sensor arrangement in which signal trends indicating the aforementioned three components and a signal trend indicating centrifugal accelerations acting overall are shown.

What is claimed is:

1. Method for determination of wheel position of wheels on a vehicle comprising the following steps:
   determining the Coriolis forces active for wheels of said vehicle,
   comparing the Coriolis forces determined for the wheels with each other,
   determining wheel position of the wheels on the vehicle by means of the comparison,
   determining the Coriolis forces active for the vehicle, and
   comparing the Coriolis forces determined for the wheels with each other using Coriolis forces determined for the vehicle as reference quantity.

2. Method according to claim 1 comprising the following additional step:
   determining the Coriolis forces active for the vehicle so that the signals indicating the active Coriolis forces are produced whose signs differ for curves in different directions.

3. Method according to claim 1 comprising the following additional step:
   determining the wheels arranged on one side of the vehicle and the wheels arranged on the other side of the vehicle by comparison of the signs of signals indicating the Coriolis forces active for wheels of the vehicle and the signs of signals indicating the Coriolis forces active for the vehicle.

4. System for determination of wheel position of wheels on a vehicle comprising:
   a control with a receiving device (An),
   wheel units (REvl, REvr, REhl, REhr) each of which are provided for one wheel of a vehicle and include
      a wheel sensor arrangement to record Coriolis forces active for the corresponding wheel and to produce signals indicating the determined Coriolis forces, and
      a transmission device to transmit signals of the wheel sensor arrangement to the receiving device (An) of the control, and
   a central unit (ZE) which includes:
      a central sensor arrangement to record Coriolis forces active for the vehicle and to produce signals indicating the determined Coriolis forces, and
      a central transmission device to transmit signals of the central sensor arrangement to the receiving device of the control, in which
   the control is set up to compare the Coriolis forces determined for the wheels based on the transmitted signals and to determine the wheel position of the wheels on the vehicle by means of the comparison, as well as to compare the Coriolis forces determined for the wheels with each other using the Coriolis forces determined for the vehicle as reference quantity.

5. System according to claim 4 wherein:
   the central unit (ZE) is laid out to determine the Coriolis forces active for the vehicle so that the signals indicating the active Coriolis forces are produced whose signs differ for curves in different directions.

6. System according to claim 4 wherein:
   the control is laid out to determine the wheels arranged on one side of the vehicle and the wheels arranged on the other side of the vehicle by comparison with the signs of the signals indicating Coriolis forces active for the wheels and the signs of the signals indicating Coriolis forces active for the vehicle.

7. System according to claim 4 wherein:
   the control is laid out to determine the wheels for which essentially the same Coriolis forces were determined and whose Coriolis forces are smaller in comparison with the Coriolis forces of the other wheels as the rear wheels of the vehicle.

8. System according to claim 7 wherein:
   the control is laid out to determine the wheels whose Coriolis forces are larger in comparison with the Coriolis forces of the rear wheels as the front wheels of the vehicle.

9. System according to claim 8 for use in a vehicle whose front wheels have a positive camber, wherein:
   the control is laid out to determine the front wheel whose Coriolis forces are smaller in comparison with the Coriolis forces of the other front wheel as the inside front wheel of the vehicle.

10. System according to claim 8 for use in a vehicle whose front wheels have a negative camber, wherein:
    the control is laid out to determine the front wheel whose Coriolis forces are greater in comparison with the Coriolis forces of the other front wheel as the inside front wheel of the vehicle.

* * * * *

UNITED STATES PATENT AND TRADEMARK OFFICE
CERTIFICATE OF CORRECTION

PATENT NO. : 7,866,206 B2
APPLICATION NO. : 11/916768
DATED : January 11, 2011
INVENTOR(S) : Rainer Achterholt It is certified that error appears in the above-identified patent and that said Letters Patent is hereby corrected as shown below:

On the title page, item [86] should read:

The correct filing date of the PCT International Application is 8 May 2006.

Signed and Sealed this
Twenty-sixth Day of March, 2013

Teresa Stanek Rea
*Acting Director of the United States Patent and Trademark Office*